United States Patent
Hiraga et al.

(10) Patent No.: US 6,545,957 B1
(45) Date of Patent: Apr. 8, 2003

(54) METHOD FOR CONTROLLING TRACK JUMPS OF OPTICAL PICKUP

(75) Inventors: Hitoshi Hiraga, Kanagawa (JP); Tetsuo Enomoto, Tokyo (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 09/537,782

(22) Filed: Mar. 29, 2000

(30) Foreign Application Priority Data

Mar. 30, 1999 (JP) .......................................... 11-088875
Jun. 17, 1999 (JP) .......................................... 11-170399

(51) Int. Cl.$^7$ ................................................ G11B 7/00
(52) U.S. Cl. ................................................ 369/44.28
(58) Field of Search ........................... 369/30.15, 47.4, 369/53.3, 44.29, 47.48, 53.34, 47.35, 47.33, 30.13, 44.28

(56) References Cited

U.S. PATENT DOCUMENTS

| | | | | |
|---|---|---|---|---|
| 4,926,405 A | * | 5/1990 | Hangai et al. ............ | 360/78.06 |
| 5,191,566 A | | 3/1993 | Yamaguchi et al. ...... | 360/78.06 |
| 5,323,368 A | * | 6/1994 | Semba ...................... | 369/30.17 |
| 5,371,726 A | | 12/1994 | Suzuki ....................... | 369/44.28 |
| 5,457,670 A | * | 10/1995 | Maeda et al. ............. | 369/44.28 |
| 5,896,365 A | * | 4/1999 | Hiroki .......................... | 388/815 |

FOREIGN PATENT DOCUMENTS

| | | |
|---|---|---|
| EP | 0 290 024 | 11/1988 |
| EP | 0 401 973 | 12/1990 |

OTHER PUBLICATIONS

Patent Abstracts of Japan vol. 016, No. 547 (P–1452), Nov. 17, 1992 & JP 04 205765 A (Canon Inc), Jul. 27, 1992.

* cited by examiner

*Primary Examiner*—Thang V. Tran
*Assistant Examiner*—Kimlien T. Le
(74) *Attorney, Agent, or Firm*—Frommer Lawrence & Haug LLP; William S. Frommer

(57) ABSTRACT

Disclosed is a method for controlling track jumps of an optical pickup in gaining high-speed access to a target track freeing from any effects of disturbances, in which time intervals of a TZC (tracking zero cross) signal are measured continuously for comparison between a target time and a measured time required for a track jump by the optical pickup. The difference in time is computed as an error, and a control signal with a voltage or a pulse width reflecting the magnitude of the error is output to an actuator of the optical pickup. In controlling the driving speed of the actuator, the comparison between target and measured times takes into account not only a time difference regarding the preceding track but also time differences with respect to a number of the previous track jumps. These time differences are illustratively averaged to yield a mean value, which is used as a basis for generating a control signal, thereby permitting fine-tuned control of the optical pickup in track jumps for high-speed and accurate positioning onto a target track freeing from any effects of scars and other disturbances on the optical disc.

7 Claims, 7 Drawing Sheets

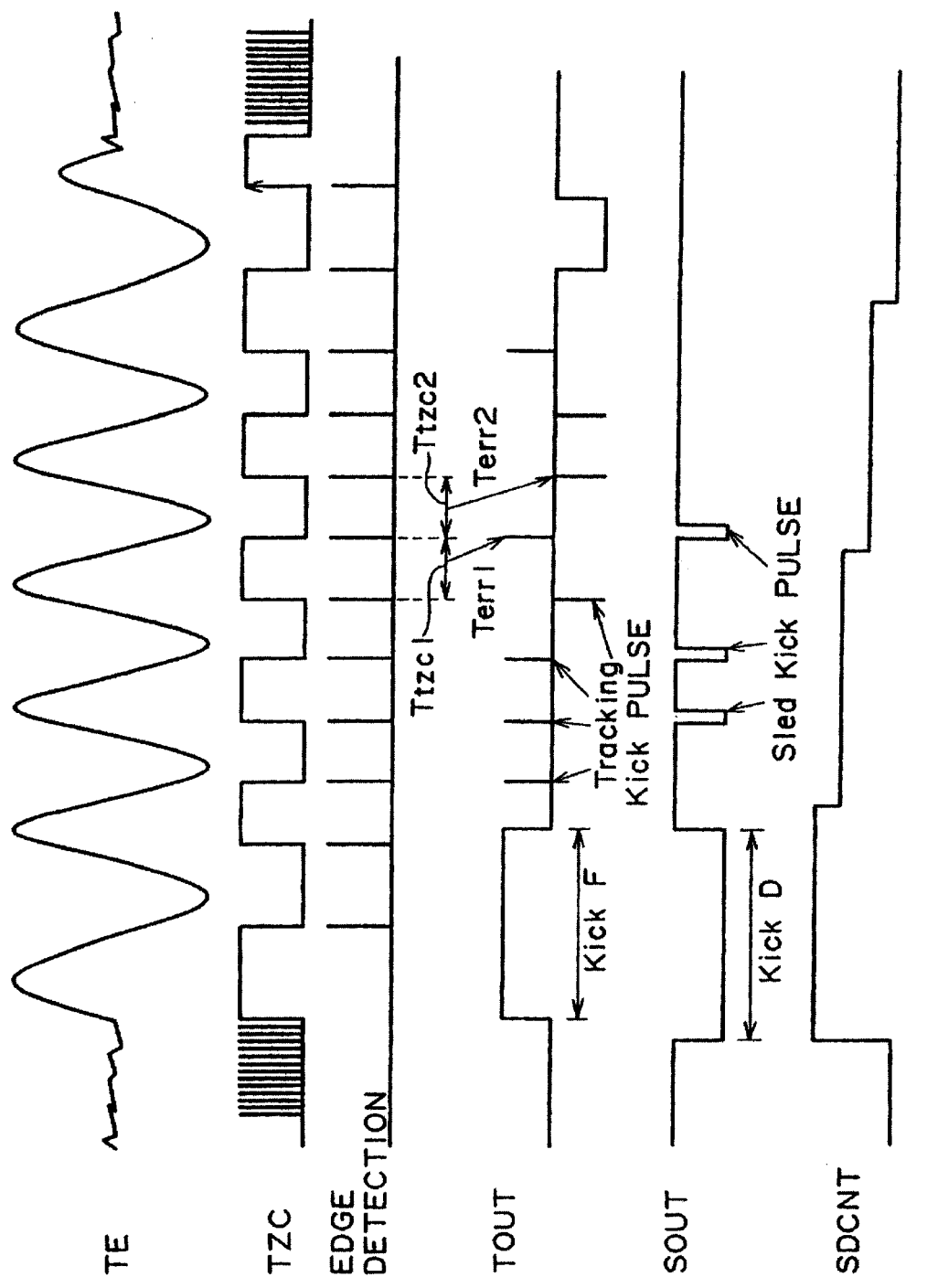

METHOD FOR CONTROLLING TRACK JUMPS OF OPTICAL PICKUP

BACKGROUND OF THE INVENTION

1. Field of the Invention

The present invention relates to a method for controlling track jumps of an optical pickup. More particularly, the invention relates to a method for controlling track jumps of an optical pickup incorporated in an optical disc apparatus by controlling the optical pickup in fine-tuned fashion such that the optical pickup is moved rapidly and accurately to a target track without suffering from any effects of disturbances such as scars on the disc the track jumps.

2. Description of the Related Art

The optical disc apparatus referred herein is a data reproducing apparatus that reproduces recorded data from an optical disc, or is an apparatus that records and reproduces data to and from an optical disc.

A typical optical disc apparatus is outlined below with reference to FIG. 6. FIG. 6 is a block diagram showing an overall structure of an optical disc apparatus.

As illustrated in FIG. 6, the optical disc apparatus 20 basically comprises: a spindle motor 2 for rotating an optical disc 1; an optical pickup 3 for irradiating a laser beam to the optical disc 1 upon data recording or reproduction; a dual-axis mechanism 4 for getting an actuator to displace an objective lens 3a of the optical pickup 3 radially across the optical disc 1 and in a way approaching and leaving the disc 1; a sled motor 5 for moving the optical pickup 3 radially across the optical disc 1; and a magnetic head, not shown, for applying a modulated magnetic field to the optical disc 1.

The optical disc apparatus 20 further includes a recording and reproducing circuit 6. The recording and reproducing circuit 6 processes video and audio signals coming from the optical pickup 3 according to predetermined formats and sends the processed results to the outside. These data are also fed back to the optical pickup 3.

In addition, the optical disc apparatus 20 comprises a servo processing circuit 7, a first driving circuit 8 and a second driving circuit 9 as control systems.

The servo processing circuit 7 analyzes reflected light signals that are detected by the optical pickup 3 from the optical disc 1. In so doing, the servo processing circuit 7 detects a focal point on the optical disc 1 of the laser beam irradiated by the optical pickup 3, as well as a relative positional relation between the laser beam and the irradiated track.

Through the first driving circuit 8, the servo processing circuit 7 then supplies a focusing control unit of the dual-axis actuator 4 in the optical pickup 3 with a control signal FOUT for controlling the focal point to within a predetermined range, and feeds a tracking control unit of the dual-axis actuator 4 in the optical pickup 3 with a control signal TOUT (tracking drive signal) for controlling to within a predetermined range the relative positional relation between the laser beam and the irradiated track.

Through the second driving circuit 9, the servo processing circuit 7 also supplies a control signal SOUT (sled drive signal) for moving the optical pickup 3 in accordance with the amount of shift made by the objective lens of the dual-axis actuator 4, to the sled motor 5 that moves the optical pickup 3. The servo processing circuit 7 thus moves the optical pickup 3 as a whole in accordance with lens moved by the dual-axis actuator 4, whereby so-called tracking control is effected for track follow-up.

Furthermore, the servo processing circuit 7 obtains through the second driving circuit 9 a detected speed value from a speed sensor 10 detecting a moving speed of the optical pickup 3. With the speed value acquired, the servo processing circuit 7 supplies the second driving circuit 9 with a control signal SDCNT (sled feed voltage) for controlling the moving speed of the optical pickup 3. This allows the optical pickup 3 to move (i.e., track jump) smoothly at the suitably controlled moving speed.

Described below with reference to FIGS. 7A through 7D is how track jumps of the conventional optical pickup 3 are typically controlled. FIGS. 7A through 7D show timing charts of signals involved in the control of track jumps of the optical pickup.

An initial motion sled kick pulse Kick D indicated by waveform in FIG. 7C is first fed to the second driving circuit 9 to start driving the sled motor 5 in a desired direction. The sled motor 5 is firstly driven so as to absorb elements of delay caused by inertia upon starting as well as by the initial motion sensitivity and static friction of the motor.

An initial motion tracking kick pulse Kick F indicated by waveform in FIG. 7B is then supplied to the first driving circuit 8 to drive the tracking control unit of the dual-axis actuator 4 in the optical pickup 3, whereby driving the objective lens 3a of the optical pickup 3 in a desired direction.

A detected signal of reflected light output from the optical pickup 3 is analyzed to find illustratively the difference in reflectance between tracks and non-track portions on the recording surface of the optical disc. Such analyzing process yields a tracking error (TE) signal representing the relative positional relation between the laser beam and tracks as indicated by waveform in FIG. 7A.

Counting zero-cross (TZC) points of the tracking error (TE) signal provides the number of tracks traversed by the optical pickup 3 in track jumps. Then, in accordance with the number of jumped tracks, a control signal SDCNT for controlling a target moving speed of the optical pickup 3 is adjusted as indicated by waveform in FIG. 7D. In addition, a tracking kick voltage is applied to a tracking actuator so as to control the track jumps of the optical pickup 3, thereby allowing the optical pickup 3 to reach a desired track.

As outlined above, the optical pickup is conventionally controlled in track jumps using control signals based on a number of factors: constant time intervals, a predetermined voltage level, or a variable voltage signal, all associated with polarity inversion between starts and stops. However, each of these control signals is determined on the basis of the result of the immediately preceding single track jump, so failure to measure that particular track jump triggers the output of erroneous kick pulses, leading to unstable control of the optical pickup.

The conventional method is thus limited in controlling capability and has had difficulty in providing high-speed access to the target track.

Furthermore, not only being poor in accuracy on jump performance, the conventional controlling method for the optical pickup exhibits tardy recovery from unstable jumps caused by scars or smears on the disc surface, leading to a jump error in some cases, thereby making it impossible to reach the target track.

SUMMARY OF THE INVENTION

The present invention has been made in view of the above circumstances and provides a method for controlling track jumps of an optical pickup in gaining high-speed access to a target track freeing from any effects of disturbances.

When devising the present inventive schemes, the inventors of this invention studied the conventional method and came to the conclusion that; the conventional speed control type method for the optical pickup exhibits its poor control capability ascribed to the process of determining the following control signal based on the result of the preceding single track jump, regardless of whether the control voltage or pulse width of the control signal was fixed or variable. The solution proposed by the inventors to the deficiency above is as follows:

Illustratively, time intervals of TZC (tracking zero cross) signals are continuously measured for comparison between a target time and a measured time. The difference therebetween is computed as an error, and a control signal with a voltage or a pulse width representing the magnitude of that error is output to the actuator of the optical pickup. For control of the driving speed of the actuator, the comparison between target and measured times should take into account not only a time difference regarding a single preceding track but also time differences with respect to a number of the previous track jumps. These time differences are then illustratively averaged so as to yield a mean value which is used as a basis for generating a control signal.

Accordingly, even using a disc in which track pitches vary for several tracks and the tracking error signal may contain so many noise elements that TZC intervals are widen or narrowed abruptly as if the TZC signals were chattering, the inventive method still allows the actual speed to be measured without error so as to ensure reliable jump motions.

In achieving the foregoing and other objects of the present invention and according to one aspect thereof, there is provided a method for controlling track jumps of an optical pickup in an optical disc apparatus for recording and reproducing data to and from an optical disc, wherein the optical pickup is moved to a target track of the optical disc comprising the steps of: when the optical pickup has jumped to a single track located halfway between a current position and the target track; computing a speed difference between a target jump speed set for the single track and an actually measured jump speed over the single track; outputting one of an acceleration signal, a deceleration signal and a speed maintaining signal representing the magnitude of the speed difference between the target jump speed and the measured jump speed as a control signal for controlling the speed for the optical pickup to jump to a next track immediately following to the single track;

adjusting the jump speed difference with respect to the single track based on at least one of speed differences between the target jump speed and the measured jump speeds regarding a plurality of tracks jumped previously to the single track, and by resorting to predetermined relational expressions; and outputting one of the acceleration signal, deceleration signal and speed maintaining signal on the basis of the adjusted jump speed difference as a control signal for a track jump to the next track.

According to the present invention, using too many tracks for adjusting the speed difference may level out control signals, resulting in poor accuracy. In practice, about three tracks are preferred, i.e., one track plus the two tracks preceding thereto.

Preferably, the method further comprises the step of computing the speed difference between the target and the measured jump speeds based on time intervals of a track jump zero cross signal.

In another preferred variation of the invention, the method further comprises the step of outputting a pulse signal having a variable pulse width as a control signal such that:

(1) if the adjusted speed difference is positive, with the measured jump speed higher than the target jump speed, the jump speed of the optical pickup is decelerated in proportion to a magnitude of the speed difference;

(2) if the adjusted jump speed difference is negative, with the measured jump speed lower than the target jump speed, the jump speed of the optical pickup is accelerated in proportion to the magnitude of the speed difference; and (3) if the adjusted jump speed difference is zero, with the measured jump speed equal to the target jump speed, the jump speed of the optical pickup is kept unchanged.

In a further preferred variation of the invention, a pulse signal having a variable pulse voltage may be output as a control signal, upon carrying out the three controlling steps above.

As outlined, the inventive method for controlling track jumps of the optical pickup involves acquiring speed differences between target and measured jump speeds from track jumps over a plurality of tracks, and supplying a tracking actuator and a sled motor with control signals reflecting the acquired speed differences between the target and the measured jump speeds for speed control. This permits accurate track jumps of the optical pickup over the disc surface regardless of disturbances.

Other objects, features and advantages of the invention will become more apparent upon a reading of the following description and appended drawings.

BRIEF DESCRIPTION OF THE DRAWINGS

FIGS. 7A through 7D show timing charts of control signals for use by a conventional method for controlling track jumps of an optical pickup.

DESCRIPTION OF THE PREFERRED EMBODIMENTS

Preferred embodiments of the present invention will now be described in detail with reference to the accompanying drawings.

Preferred Embodiment

Figure 1:
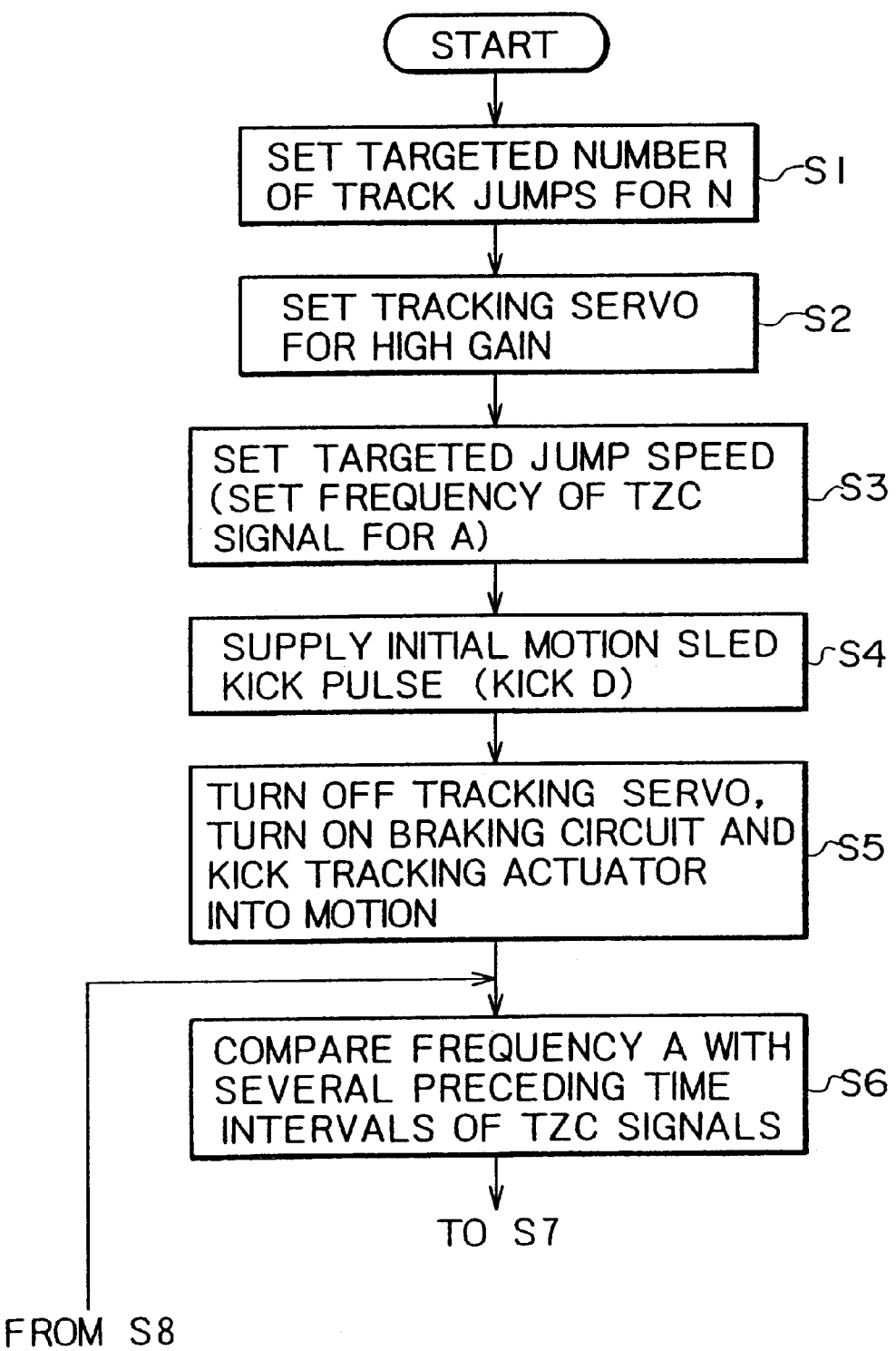
FIG. 1 is a flowchart of steps constituting a procedure for illustratively carrying out a method for controlling track jumps of an optical pickup as an embodiment of the invention.
Figure 2:
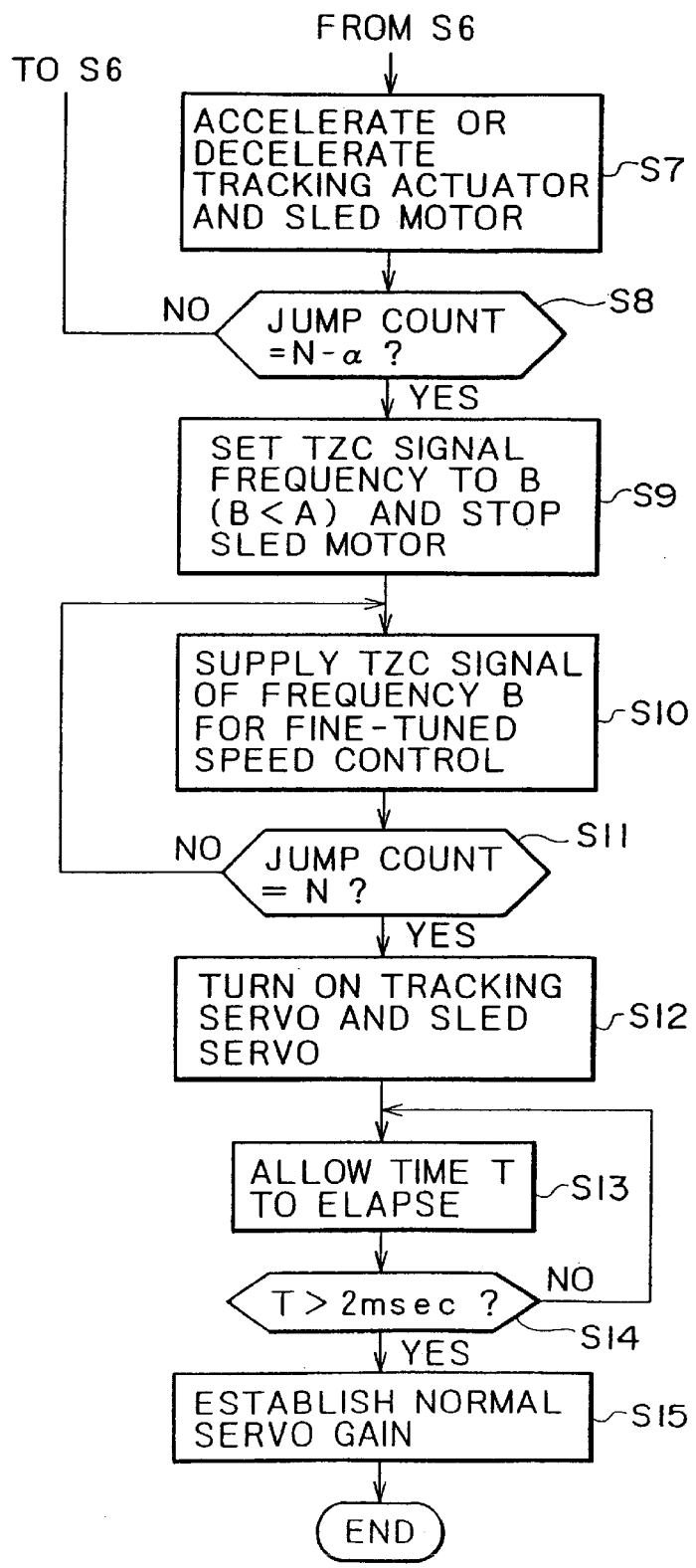
FIG. 2 is a flowchart continued from that of FIG. 1.
Figure 3:
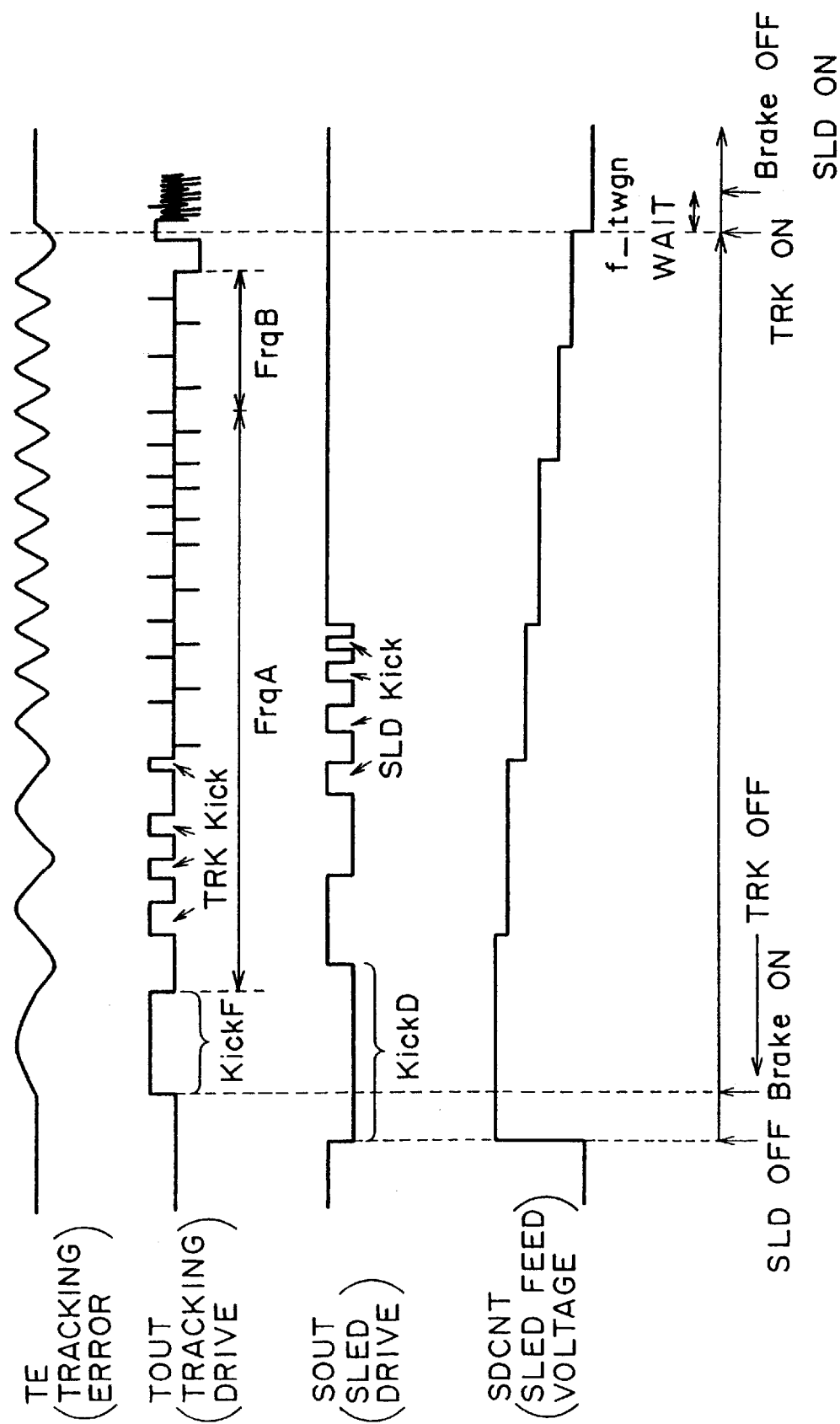
FIG. 3 is a timing chart of signals used under a kick pulse width variable control scheme.
Figure 4:
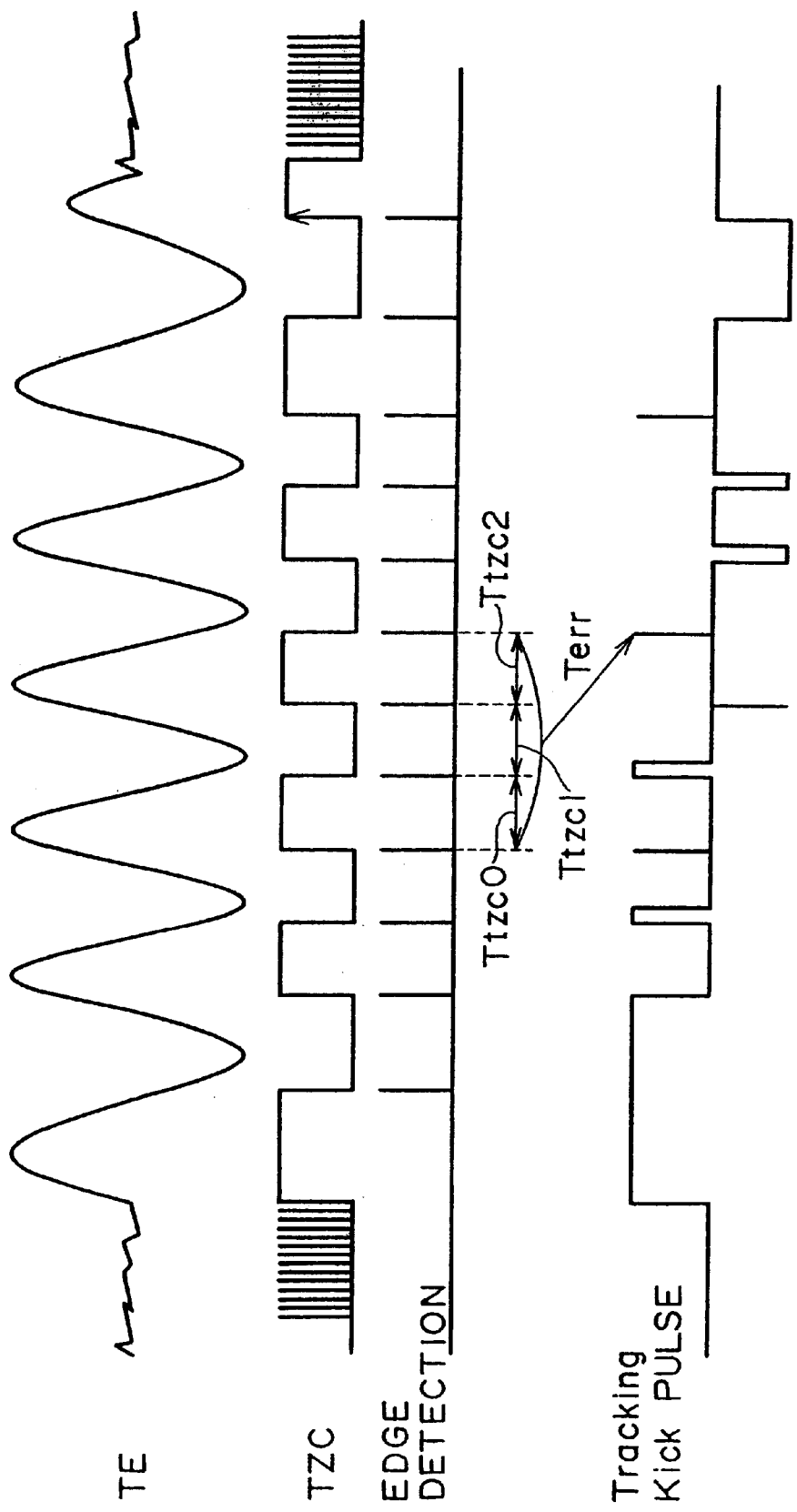
FIG. 4 is a detailed timing chart of signals used under the kick pulse width variable control scheme.
Figure 5:
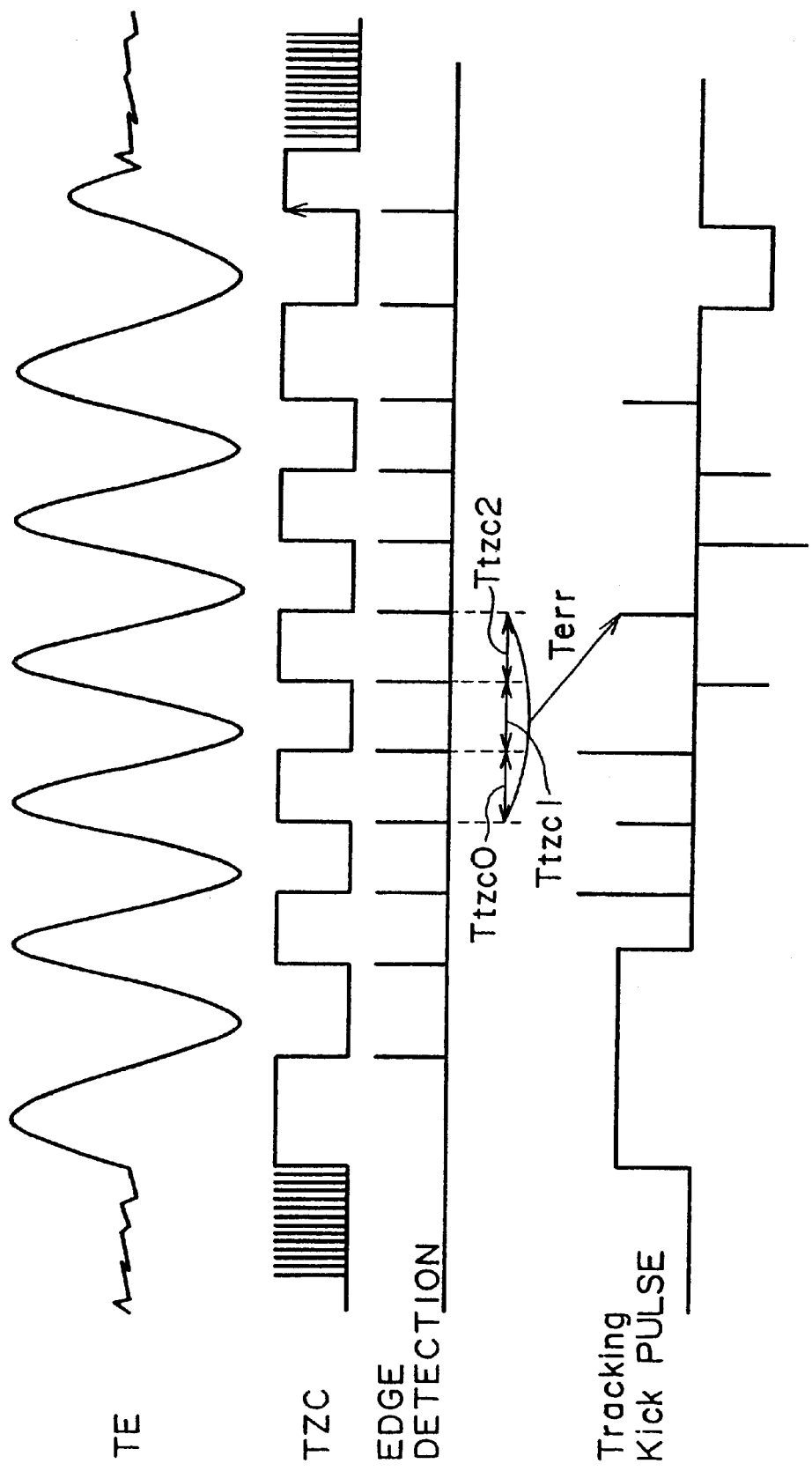
FIG. 5 is a detailed timing chart of signals used under a kick pulse voltage variable control scheme.
Figure 6:
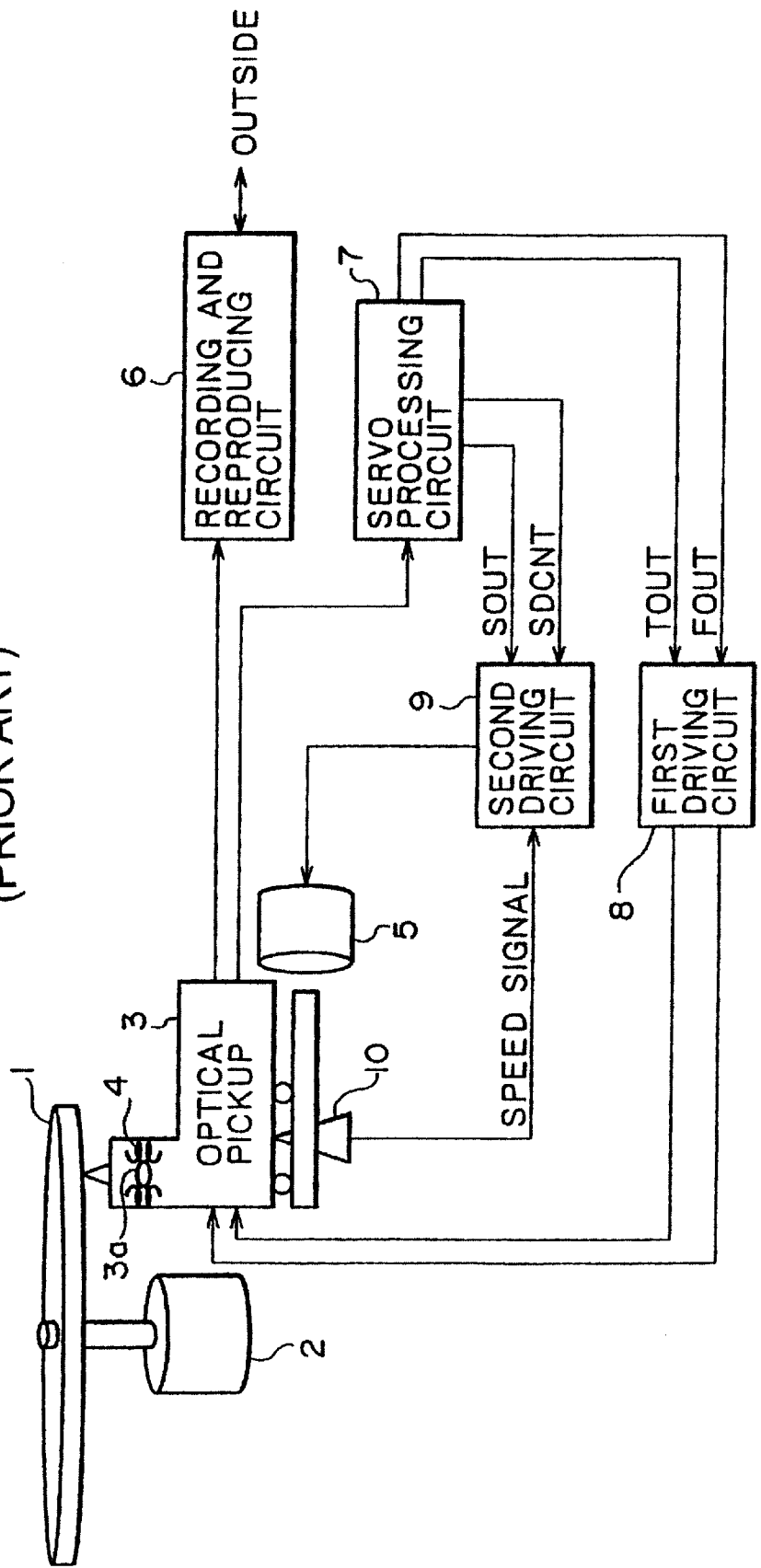
FIG. 6 is a block diagram showing an overall structure of a typical optical disc apparatus.

Described below is one preferred embodiment of a method for controlling track jumps of an optical pickup according to the invention, the method being applied to the above-mentioned optical disc apparatus 20. FIGS. 1 and 2 are flowcharts showing steps constituting a procedure for carrying out the inventive track jump controlling method for the optical pickup; FIG. 3 is a timing chart of signals used under a kick pulse width variable control scheme for controlling track jumps of the optical pickup; FIG. 4 is a detailed timing chart of signals used under the kick pulse width variable control scheme; and FIG. 5 is a detailed timing chart of signals used under a kick voltage variable control scheme for controlling track jumps of the optical pickup.

The method for controlling the track jump of the optical pickup incorporated into the optical disc apparatus 20 will now be described.

In the description that follows, the inventive method for controlling optical pickup track jumps may be referred to as "fine search" because the method permits highly accurate search or control.

The track jump controlling method embodying the invention is explained with reference to FIG. 1.

At the start of track jump control of the optical pickup, a tracking servo is turned on and a sled servo is turned off.

A target number of track jumps is set as N in step S1, followed by step S2. The target number of jumps signifies a desired number of tracks over which the optical pickup is moved as it traverses the disc surface. If the optical pickup is to traverse from a current track $N_1$ to a target track $N_2$, then the target number of track jumps N is given as $N=N_2-N_1$.

In step S2, the tracking servo is set at a high gain before step S3 is reached.

In step S3, the TZC signal is set illustratively for a frequency A to determine a target tracking jump speed of the optical pickup. Step S3 is followed by step S4.

In step S4, a kick pulse indicated as "Kick D" in FIG. 3 is applied to the sled motor 5. Step S4 is followed by step S5.

In this embodiment, as shown in FIG. 3, a sled drive signal is charged with an initial motion sled kick pulse (Kick D) that kicks the sled motor 5 into motion. The Kick D pulse is generated chronically little earlier than a tracking drive signal Kick F in order to absorb and compensate for a delayed motion of the optical pickup 3 due to its mass inertia and a poor initial motion sensitivity of the sled motor 5, as well as to remove a delay caused by static friction of the pickup. In other words, the sled drive signal is temporally staggered with respect to the tracking drive signal so as to absorb the elements of delay in the motion of the optical pickup 3.

In step S5, firstly, the tracking servo is turned off and a braking circuit of the tracking servo is turned on. The tracking drive signal is charged with an initial motion tracking kick pulse indicated as "Kick F" in FIG. 3 that kicks the dual-axis actuator 4 into motion. With the tracking thus accelerated, step S6 is reached.

After the Kick F pulse is supplied to the tracking drive signal, the track jump speed of the optical pickup 3 is controlled so that the TZC signal will reach the established frequency A. Then, the optical pickup 3 moves close to the target track $N_2$ along with the sled motor 5.

In step S6, the frequency A is compared with time intervals of the several preceding TZC signals. Details of the comparison will be described later. Step S6 is followed by step S7.

In step S7, kick pulses are generated in accordance with the result of the comparison so as to accelerate or decelerate the dual-axis actuator 4 and sled motor 5. There are two schemes for acceleration and deceleration: a pulse width variable control scheme, and a pulse voltage variable control scheme, as will be described later. The pulse width or pulse voltage representing a kick pulse time is adjusted in accordance with differences between the intervals of the TZC signals and a target time. Step S7 is followed by step S8.

In step S8, a judgment is made to see if the number of track jumps by the optical pickup 3 is $N-\alpha$. If the jump count is equal to $N-\alpha$, then step S9 is reached; otherwise step S6 is reached again.

The value $\alpha$ denotes the number of tracks established as a difference between the target track $N_2$ and a track on which the optical pickup 3 switches the TZC signal frequency from A to B (A>B). If the track $N_p$ at the current position of the optical pickup 3 is defined as $N_p=N-\alpha$, i.e., if the optical pickup 3 is positioned $\alpha$ tracks ahead of the target track, then step S9 is reached to switch the frequency of the TZC signal from A to B.

With the optical pickup 3 located close to the target track $N_2$ in step S9, the frequency of the TZC signal is set for frequency B lower than the frequency A for performing speed control in fine-tuned fashion while the sled motor 5 is stopped to prepare for a jump end, before step S10 is reached. That is, the sled motor 5 is stopped temporarily and then applied with kick pulses or a voltage for more movement based on the amount of shift by the objective lens of the optical pickup 3 that keeps moving because of its inertia.

If the target track $N_2$ is reached in step S9, brake pulses are applied to the braking circuit for sufficient deceleration just like that in single track jump control.

In step S10, the optical pickup 3 is controlled its speed for track jump in fine-tuned fashion by use of the TZC signal having the lower frequency B. Step S10 is followed by step S11.

In step S11, a judgment is made to see if the number of track jumps is equal to N. If the jump count is found to have reached N, that means the optical pickup 3 is positioned on the target track $N_2$. In that case, step S12 is reached. If the jump count is less than N, step S10 is reached again.

In step S12, the tracking servo is turned on. After activation of the tracking servo is verified, the sled servo is turned on. Step S12 is followed by step S13.

In step S13, a time T is allowed to elapse, holding the current status as it is. Upon elapse of the time T, step S14 is reached.

In step S14, a judgment is made to see if the wait time T is longer than 2 milliseconds (T>2 msec). If the time T is found to be longer than 2 milliseconds, step S15 is reached; otherwise step S13 is reached again.

In step S15, the track jump is completed, and the normal tracking gain is established. This terminates execution of the track jump control procedure.

In step S9 of this embodiment, the sled motor is stopped temporarily and then applied with kick pulses or a voltage for more movement based on the amount of shift made by the objective lens 3a of the optical pickup 3. However, this is not limitative of the invention, and the sled motor 5 may alternatively be left turned on.

Where the sled motor 5 moves faster, the sled motor 5 may be stopped temporarily to let the optical pickup 3 move under its own inertia. Otherwise pulses in the opposite direction may be applied to control the sled motor 5 for deceleration.

Although two frequencies (time) A and B are used for the TZC signal in this embodiment, that is not limitative of the invention. Alternatively, three or more frequencies may be set in conjunction with more detailed target time settings for achieving fine-tuned speed control.

All set values and parameters used in this embodiment are for illustrative purposes only. In practice, such values may be set so as to comply with specific characteristics of the optical pickup and its driving mechanisms actually employed therein.

FIG. 3 is a timing chart showing a tracking error signal (TE), a tacking drive signal (TOUT), a sled drive signal (SOUT) and a sled feed voltage (SDCNT) used to control track jumps of the optical pickup under the kick pulse width variable control scheme.

In FIG. 3, the frequency (time) of kick pulses is set for an optimal value representing the number of tracks leading up to the target track. When the optical pickup reaches the target track, time deceleration pulses are output to the braking circuit of the sled motor 5 for smooth positioning onto the target track.

The sled motor 5 is moved by application of kick pulses or a voltage determined in accordance with the amount of shift made by the objective lens of the optical pickup.

Described below is the comparison of the time intervals of the TZC signal with the frequency A performed in step S6, followed by the acceleration/deceleration adjustment of the dual-axis actuator 4 and sled motor 5 performed in step S7. These workings will be explained for two cases: under the pulse width variable control scheme in effect, and under the pulse voltage variable control scheme in effect.

(1) Pulse Width Variable Control Search

How track jumps are controlled under the pulse width variable control scheme will now be described with reference to FIG. 4.

It is assumed that a target jump time is represented by Ttgt and that an actually measured time from edge to edge of a TZC signal is denoted by Ttzc0. The target jump time is a target time set for the interval of the TZC signal during track jump depending on the number of tracks to be jumped. It is also assumed that other edge-to-edge measured times of TZC signals are denoted by Ttzc1 and Ttzc2 sequentially. Although three TZC signal intervals are sampled in this embodiment, this is not limitative of the present invention. A suitable number of samples may be taken depending on the operating status of the optical pickup 3.

Errors between the target time and the measured time are defined as Terr0 =Ttgt−Ttzc0, Terr1 =Ttgt−Ttzc1, and Terr2 =Ttgt−Ttzc2. The information Terr0 through Terr2 are used as a basis for computing a definitive error Terr according to predetermined methods. The definitive error is used to adjust the time width of kick pulses for the dual-axis actuator 4 so that optimal kick pulses are eventually supplied to the actuator.

The predetermined methods for definitive error computation include, among others, a method for finding a mean value of the computed errors, and a method for ignoring those exhibiting extreme measurements, supposedly attributable to erroneous measuring procedures or to some disturbances while obtaining a mean value of the remaining errors computed.

In short, kick pulses are generated by observing not only the interval regarding the single preceding TZC signal but also intervals of the several recently preceding TZC signals. Given the speed measurement, the suitable kick pulses are generated and supplied.

Below is a description of what takes place in two cases: when operating the actuator at high speed, and when operating the actuator at low speed.

(a) When the Operating Speed of the Actuator is High

When the operating speed of the actuator is high, the wave-to-wave distance in a traverse waveform of the tracking error signal is narrowed, and so is the time interval of the TZC signal, i.e., the width of zero cross pulses of the tracking error signal.

This means that the frequency of the signal is raised. The case applies when the speed of the actual jump motion of the optical pickup 3 is higher than the target speed, with the error Terr greater than 0 (Terr>0).

In this case, the error is compensated by applying the dual-axis actuator 4 with pulses in the decelerating direction. The greater the error Terr (i.e., the higher the frequency) gets, the more the pulse width is applied to reinforce deceleration for the fastest possible approach to the target time Ttgt.

(b) When the Operating Speed of the Actuator is Low

Conversely, when the operating speed of the actuator is low, the wave-to-wave distance in the traverse waveform of the tracking error signal is widened, and so is the time interval of the TZC signal. This means that the frequency of the signal is lowered.

It is the case where the speed of the actual jump motion of the optical pickup 3 is lower than the target speed, with the error Terr being less than 0 (Terr<0).

In this case, the error is compensated by applying the dual-axis actuator 4 with pulses in the accelerating direction. Moreover, reversed-polarity pulses with the larger width is applied to the error Terr as the error Terr grows greater (i.e., being lowered in frequency) to reinforce acceleration for the fastest possible approach to the target time Ttgt.

As described, the kick pulse width is varied in accordance with the error (Terr) in the measured times Ttzc obtained as a result of measuring the multiple preceding jumps with respect to the target time Ttgt. The kick pulses with their width thus adjusted are used to carry out optimal track jumps.

(2) Pulse Voltage Variable Control Search

How track jumps are controlled under the pulse voltage variable control scheme will now be described with reference to FIG. 5.

As with the pulse width variable control scheme, the actual jump time (TZC time interval) is measured and an error Terr with respect to the target time is obtained.

Errors between the target time and the measured times are defined as Terr0 =Ttgt−Ttzc0, Terr1 =Ttgt−Ttzc1, and Terr2 =Ttgt−Ttzc2. The information Terr0, Terr1 and Terr2 are used as a basis for computing a definitive error Terr, using suitable methods. The definitive error is used to adjust the kick voltage for the dual-axis actuator 4 so that optimal kick pulses are eventually generated.

The suitable methods for definitive error computation include, among others, a method for finding a mean value amongst the computed errors Terr0, Terr1 and Terr2, and a method for ignoring those exhibiting extreme measurements supposedly attributable to erroneous measuring procedures or to some disturbances while obtaining a mean value of the remaining errors computed.

Kick pulses are generated not only by observing the interval of the single preceding TZC signal, but also time intervals of the several preceding TZC signals. The time interval information thus acquired from the three preceding TZC signals is used to accurately detect the speed at which that optical pickup is currently moving. Given the speed measurement, the suitable kick pulses are generated and supplied.

(a) When the Operating Speed of the Actuator is High

When the operating speed of the actuator is high, the wave-to-wave distance in the traverse waveform of the tracking error signal is narrowed, and so is the time interval of the TZC signal.

That is, the frequency of the signal is raised. It is the case where the speed of the actual jump motion of the optical pickup 3 is higher than the target speed, with the error Terr greater than 0 (Terr>0).

In this case, the error is compensated by supplying the dual-axis actuator 4 with pulses in the decelerating direction. Further the greater the error Terr (i.e., the higher the frequency) grows, the higher the pulse voltage is applied to reinforce deceleration for the fastest possible approach to the target time Ttgt.

(b) When the Operating Speed of the Actuator is Low

Conversely, when the operating speed of the actuator is relatively low, the wave-to-wave distance in the traverse waveform of the tracking error signal is widened, and so is the time interval of the TZC signal. That is, the frequency of the signal is lowered.

It is the case where the speed of the actual jump motion of the optical pickup 3 is lower than the target speed, with the error Terr less than 0 (Terr<0). In this case, the error is compensated by supplying the dual-axis actuator 4 with pulses in the accelerating direction, and the greater the error Terr (i.e., the lower the frequency) grows, the higher the reversed-polarity pulse voltage is applied to reinforce acceleration for the fastest possible approach to the target time Ttgt.

As described, the kick voltage level is varied in accordance with the error (Terr) in the measured times Ttzc obtained as a result of the multiple preceding jumps with respect to the target time Ttgt. The kick voltage thus adjusted is used to carry out optimal track jumps.

From the different point of view, the scheme above is designed to raise the gain for tracking speed control of the optical pickup 3, in which the kick voltage is varied according to the error in the measured times Ttzc with respect to the target time so as to bring about optimal track jumps.

One of the two track jump control schemes described above, i.e., pulse width variable search or pulse voltage variable search, may be implemented selectively depending on the manner of search (jump) and the operating status of the optical pickup. More accurate control is made possible, if one of these schemes is utilized selectively in accordance with the jump distance and optical disc type.

The two schemes may alternatively be used in combination for speed control achieving still higher levels of accuracy.

In the manner described above, the dual-axis actuator 4 is well controlled in speed, presenting the high level of speed control with accuracy. Accordingly, the method of the present invention permits reliable jump performance.

To sum up, the inventive method involves comparing a target time required for track jump by the optical pickup with actually measured time, computing time differences therebetween as an error, and supplying the actuator of the optical pickup with control signal having a voltage or a pulse width reflecting the magnitude of the error thus computed for controlling the driving speed of the actuator. At that time, the signal for controlling the actuator driving speed is generated by considering time differences not only in the time difference in the single preceding track jump but also in the time difference in the several track jumps preceding to the single track jump performed. These time differences are averaged to yield a mean value which is then used as a basis for generating the control signal.

When being implemented as described, the method according to the present invention permits fine-tuned control of the optical pickup in track jumps for high-speed and accurate positioning onto a target track freeing from any effects of scars and other disturbances on the optical disc.

On a disc where track pitches vary for several tracks, the tracking error signal containing numerous noise components prompt TZC intervals to widen or narrow abruptly, as if the TZC were chattering. Even such a case, the inventive method still ensures reliable jump motions by surmounting conventional flaws of speed control.

As many apparently different embodiments of this invention may be made without departing from the spirit and scope thereof, it is to be understood that the invention is not limited to the specific embodiments thereof except as defined in the appended claims.

What is claimed is:

1. A method for controlling track jumps of an optical pickup in an optical disc apparatus for recording and reproducing data to and from an optical disc, wherein said optical pickup is moved to a target track of said optical disc, comprising the steps of:

when said optical pickup has jumped to a single track located halfway between a current position and said target track, computing a speed difference between a target jump speed set for said single track, and an actually measured jump speed over said single track;

outputting one of an acceleration signal, a deceleration signal and a speed maintaining signal representing the magnitude of the speed difference between the target and the measured jump speeds as a control signal for controlling the speed for said optical pickup to jump to a next track immediately following to said single track;

adjusting the jump speed difference with respect to said single track based on at least one of speed differences between the target and the measured jump speeds regarding a plurality of tracks jumped previously to said single track, and by resorting to predetermined relational expressions; and outputting one of said acceleration signal, said deceleration signal and said speed maintaining signal on the basis of the adjusted jump speed difference as a control signal for a jump over the next track.

2. A method for controlling track jumps of an optical pickup according to claim 1, further comprising the step of computing the speed difference between the target and the measured jump speeds based on time intervals of a track jump zero cross signal.

3. A method for controlling track jumps of an optical pickup according to claim 1, further comprising the step of outputting a pulse signal having a variable pulse width as a control signal such that:

(1) if the adjusted speed difference is positive, with the measured jump speed higher than said target jump speed, the jump speed of said optical pickup is decelerated in proportion to a magnitude of the speed difference;

(2) if said adjusted jump speed difference is negative, with said measured jump speed lower than said target jump speed, said jump speed of said optical pickup is accelerated in proportion to the magnitude of said speed difference; and (3) if said adjusted jump speed difference is zero, with said measured jump speed equal to said target jump speed, said jump speed of said optical pickup is kept unchanged.

4. A method for controlling track jumps of an optical pickup according to claim 1, further comprising the step of outputting a pulse signal having a variable voltage as a control signal such that:

(1) if the adjusted speed difference is positive, with the measured jump speed higher than said target jump speed, the jump speed of said optical pickup is decelerated in proportion to a magnitude of the speed difference;

(2) if said adjusted jump speed difference is negative, with said measured jump speed lower than said target jump speed, said jump speed of said optical pickup is accelerated in proportion to the magnitude of said speed difference; and (3) if said adjusted jump speed difference is zero, with said measured jump speed equal to said target jump speed, said jump speed of said optical pickup is kept unchanged.

5. A method for controlling track jumps of an optical pickup according to claim 3, further comprising the step of selecting one of said three track jump controlling steps depending on operating status of said optical pickup.

6. A method for controlling track jumps of an optical pickup according to claims 1, further comprising the step of either acquiring a mean value of the speed differences using predetermined relational expressions, or acquiring another mean value of said speed differences by eliminating any speed differences exceeding a predetermined range of the mean value.

7. A method for controlling track jumps of an optical pickup according to claim 4, further comprising the step of selecting one of said three track jump controlling steps depending on operating status of said optical pickup.

* * * * *